(12) United States Patent
Smith et al.

(10) Patent No.: US 8,594,511 B2
(45) Date of Patent: Nov. 26, 2013

(54) METHOD AND APPARATUS FOR MAINTAINING A COHERENT COMBINED BEAM DURING ARBITRARY STEERING

(75) Inventors: Irl W. Smith, Concord, MA (US); Kirk L. Fisher, Groton, MA (US); Evelyn W. Kapusta, Cambridge, MA (US)

(73) Assignee: Raytheon Company, Waltham, MA (US)

( * ) Notice: Subject to any disclaimer, the term of this patent is extended or adjusted under 35 U.S.C. 154(b) by 1393 days.

(21) Appl. No.: 12/325,241

(22) Filed: Nov. 30, 2008

(65) Prior Publication Data

US 2009/0142073 A1 Jun. 4, 2009

Related U.S. Application Data

(60) Provisional application No. 60/991,403, filed on Nov. 30, 2007.

(51) Int. Cl.
*H04B 10/04* (2011.01)
(52) U.S. Cl.
USPC .......................................... 398/182; 398/192
(58) Field of Classification Search
USPC .......................... 398/182, 188, 198, 195, 201
See application file for complete search history.

(56) References Cited

U.S. PATENT DOCUMENTS

| | | | |
|---|---|---|---|
| 5,383,207 A * | 1/1995 | Culverhouse et al. | 372/28 |
| 6,385,228 B1 | 5/2002 | Dane et al. | |
| 7,058,098 B1 | 6/2006 | Shay | |
| 7,146,070 B1 * | 12/2006 | Li et al. | 385/18 |
| 7,457,547 B2 * | 11/2008 | Frisken et al. | 398/158 |
| 2003/0227948 A1 * | 12/2003 | Rice | 372/6 |
| 2004/0246604 A1 * | 12/2004 | Fiete et al. | 359/850 |
| 2008/0218738 A1 * | 9/2008 | Trainer | 356/72 |

OTHER PUBLICATIONS

PCT International Preliminary Report on Patentability of the ISA dated Jun. 10, 2010 for PCT/US2008/013242, pp. 1-8.
Vorontsov; "Adaptive Photonics Phase-Locked Elements (APPLE): System Architecture and Wavefront Control Concept," Invited Paper; Target-in-the-Loop: Atmospheric Tracking, Imaging, and Compensation II; Proceedings of SPIE vol. 5895; Jul. 31, 2005; pp. 1-9.
Office Action dated Jan. 13, 2012 from counterpart Japanese Patent Application 2010-536018.
Response to Office Action dated Jan. 13, 2012 for Japanese Patent Application 2010-536018.
Notice of Allowance with Allowed Claims (English Version) for Japanese Patent Application 2010-536018, Aug. 2012.
Notification of Transmittal of the International Search Report dated Apr. 7, 2009, PCT/US2008/013242.

(Continued)

*Primary Examiner* — Xinning Niu
(74) *Attorney, Agent, or Firm* — Daly, Crowley, Mofford & Durkee, LLP (57) ABSTRACT

A method and apparatus for accounting for phase differences in a transmit path of an optical system is provided. A transmit control system nullifies phase errors in signals propagating from a coherent source to phase samplers and back to a transmitter sensor. A small time-dependent length modulation is applied to a feed fiber of each aperture and this modulation enables a hill-climbing servo loop to increase, or in some cases even maximize, a detected intensity. This results in a particular relationship between the phases at all the phase-sampling points. The optical system is then calibrated so that this relationship corresponds to in-phase beams when the optical system is aimed at boresight.

23 Claims, 7 Drawing Sheets

(56) References Cited

OTHER PUBLICATIONS

The International Search Report dated Mar. 18, 2009, PCT/US2008/013242.

Written Opinion of the International Searching Authority dated Mar. 18, 2009, PCT/US2008/013242.

Mikhail Voronstov, Adaptive Photonics Phase-Locked Elements (APPLE): System Architecture and Wavefront Control Concept, pp. 1-1-1-9, May 2007.

* cited by examiner

METHOD AND APPARATUS FOR MAINTAINING A COHERENT COMBINED BEAM DURING ARBITRARY STEERING

RELATED APPLICATIONS

This application claims the benefit of U.S. Provisional Application No. 60/991,403 filed Nov. 30, 2007 under 35 U.S.C. §119(e) which application is hereby incorporated herein by reference in its entirety.

STATEMENT REGARDING FEDERALLY SPONSORED RESEARCH

This invention was made with Government support under Contract FA9453-05-C-0238 awarded by the Air Force Research Laboratory. The Government has certain rights in the invention.

FIELD OF THE INVENTION

The structures and techniques described herein relate to optical transmit-receive systems and more particularly to free-space laser/optical transmit-receive systems.

BACKGROUND OF THE INVENTION

As is known in the art, for receive operations in an optical transmit-receive system, such as an optical communications system for example, phase wavefronts are uniform when entering an array of optical apertures and receive paths of the system function to provide minute adjustments to compensate for phase errors in the receive path. By compensating for phase errors, it is possible to maximize the power into a receiver.

During a transmit operation, a coherent source provides an optical transmit signal (e.g. an optical communication signal) which is divided among, and emitted through, a plurality of optical apertures. Ideally, the transmit signals exit each aperture in phase such that the phase wavefronts form a plane. One difficulty with the transmit operation, however, is the ability to dynamically and continuously measure and compensate for aperture-to-aperture wavefront errors (including overall, or "piston", phase errors) in a manner which allows the system to meet certain requirements regarding coherence of transmit signals while at the same time staying within desired size, weight and power (SWaP) constraints. In a communications system, for example, a system must meet certain requirements to achieve adequate link margin while at the same time staying within designated SWaP constraints of an operational platform.

SUMMARY OF THE INVENTION

In accordance with the techniques and concepts described herein, a local back-coupling mechanism herein called a phase sampler is disposed at each aperture in an optical transmit system to provide signals which are used to obtain coherence between optical signals emitted from all apertures in the transmit path. The phase samplers intercept a portion of the transmitted signals as they exit each aperture and reflect or otherwise redirect the captured signal portions back into the aperture and thus redirect them through the transmit path. The back-reflected signal portions traverse their respective transmit paths and are directed to a transmitter sensor and a transmit control system which analyzes the signals and provides control signals to control the individual transmit path lengths.

With this particular arrangement, a technique for accounting for phase differences in a transmit path of an optical system is provided. The transmit control system nullifies any phase error from the coherent source to the phase samplers and back to the transmitter sensor. The transmit control system applies small time-dependent phase modulation to light coupled via a feed fiber coupled to each aperture. This modulation enables a hill-climbing servo loop to maximize the detected intensity of the back-reflected signal portions by adjusting phase lengths of the transmit signal paths. This results in a particular relationship between the phases at the phase-sampling points. The system is then calibrated so that this relationship corresponds to in-phase beams when the system is aimed at boresight. In one embodiment, the modulation is provided via a fiber-stretcher, but any technique or apparatus which can provide appropriate modulation may, of course, also be used.

Because the back-reflected signal portion (also referred as a control beam) passes twice through the transmit path (once in each direction), the transmit control system ensures that the relative double-pass transmit path lengths are an integer multiple of transmit wavelengths ($\lambda_{Tx}$), or, stated differently, that the relative phases ($\Delta\theta_{nm}$) are an integer multiple of $2\pi$ apart. However, since the transmit path is traversed twice, the relative phase at an exit plane of each aperture will be an integer multiple of $\pi$ but not necessarily of $2\pi$. This implies that the relative phases at the plane defined by the phase samplers are only being controlled to a $\lambda_{Tx}/2$, not the desired full wave. This introduces $\pi$ uncertainties or ambiguities. Notionally, the system tests the various possible phase shifts while remembering the intensity reported from a remote terminal and then chooses the phase shift which results in maximum intensity. Once the system has been properly initialized, the ambiguities play no further role since the transmit control system prevents any discontinuous change in phase.

Assuming that the ambiguities are resolved, at a particular instant the wavefront of the transmitted beam from each of aperture will pass through a point defined by its phase sampler. For the purpose of this example, it is assumed that these phase-sampler-defined points lie in a plane taken to be normal to boresight, although this is not a requirement. The control strategy assures that, at a given instant, each aperture's transmitted wavefront contains a fixed point defined by the phase sampler. Any path length disturbances are immediately counteracted to maintain the "wavefronts normal to boresight" condition. Because the wavefront is fixed at boresight, additional features are required to the transmit approach to correct for the relative phase changes that result from a steering angle. This is accomplished by computing an aperture phase error due to steering of a transmit beam (i.e. a geometrically computed phase shift correction) and applying the geometrically computed phase shift directly to the transmit beam. This geometrically computed phase shift correction is applied only to the transmit beam and is not applied to the control beam.

DETAILED DESCRIPTION OF THE PREFERRED EMBODIMENTS

Before describing an optical transmit system and method for maintaining a coherent combined beam during arbitrary steering, some introductory concepts and terminology are explained.

Reference is sometimes made herein to a "back-coupling mechanism" or a "phase sampler." As used herein, the term phase sampler refers to any element or structure which can intercept (or couple or otherwise capture) a portion of light coming from a downstream point in an optical path and send such intercepted light back through the optical path (i.e. send the light upstream through the optical path). Typically a phase sampler intercepts light having a phase shift which might drift because of thermal or aging effects of any upstream component and sends such intercepted light back (upstream) through the optical train to a predetermined point (e.g. a point where signals are split from a single source fiber or combined into a single receive fiber) so that by using feedback control to cancel the phase drift a phase-stable coherently-combined composite output beam is achieved.

A "back-coupling mechanism" or a "phase sampler" may be provided in a number of ways. One phase sampler embodiment is provided by arranging that a portion (e.g., a quadrant) of a transmit aperture not be steered as a main transmit beam is steered. In a system which uses optical phased arrays (OPAs) for angular changes, it is possible to arrange that a portion of an aperture not steer a beam, e.g., by appropriately forming a control-electrode structure of the OPA. In general, all that is required is that a portion of a beam bypass a beam-steering system. That portion falls on a mirror which redirects the light exactly in the opposite direction. Since the relative locations of these mirrors determines the overall phase stability, it is advantageous that the mirrors all be part of a single component, which might be a lightweight, rigid frame carrying individual mirrors, or highly-reflective portions of the surface of a single optical flat which has an antireflection coating on the remaining portions.

In a second phase sampler embodiment, an unsteered portion of light exists throughout a whole transmit aperture. In a beamsteering system using OPA-based electronic beam steering, this may be done by modifying control signals to such electronic beamsteering apparatus embodied in a transmit aperture so that some light is allowed to pass through without being steered. In this case, a mirror located similarly to the optical flat in the first embodiment is furnished with a partially reflective coating throughout instead of high- and low-reflective portions.

In a third embodiment, a retroreflective device which may, for example, be of the type described at http://en.wikipedia.org/wiki/Retro-reflector is placed in front of a portion of a transmit aperture so as to intercept and retro-reflect a portion of an outgoing beam. Such an embodiment requires no modification to the function of a transmit beamsteering system.

Figure 1:
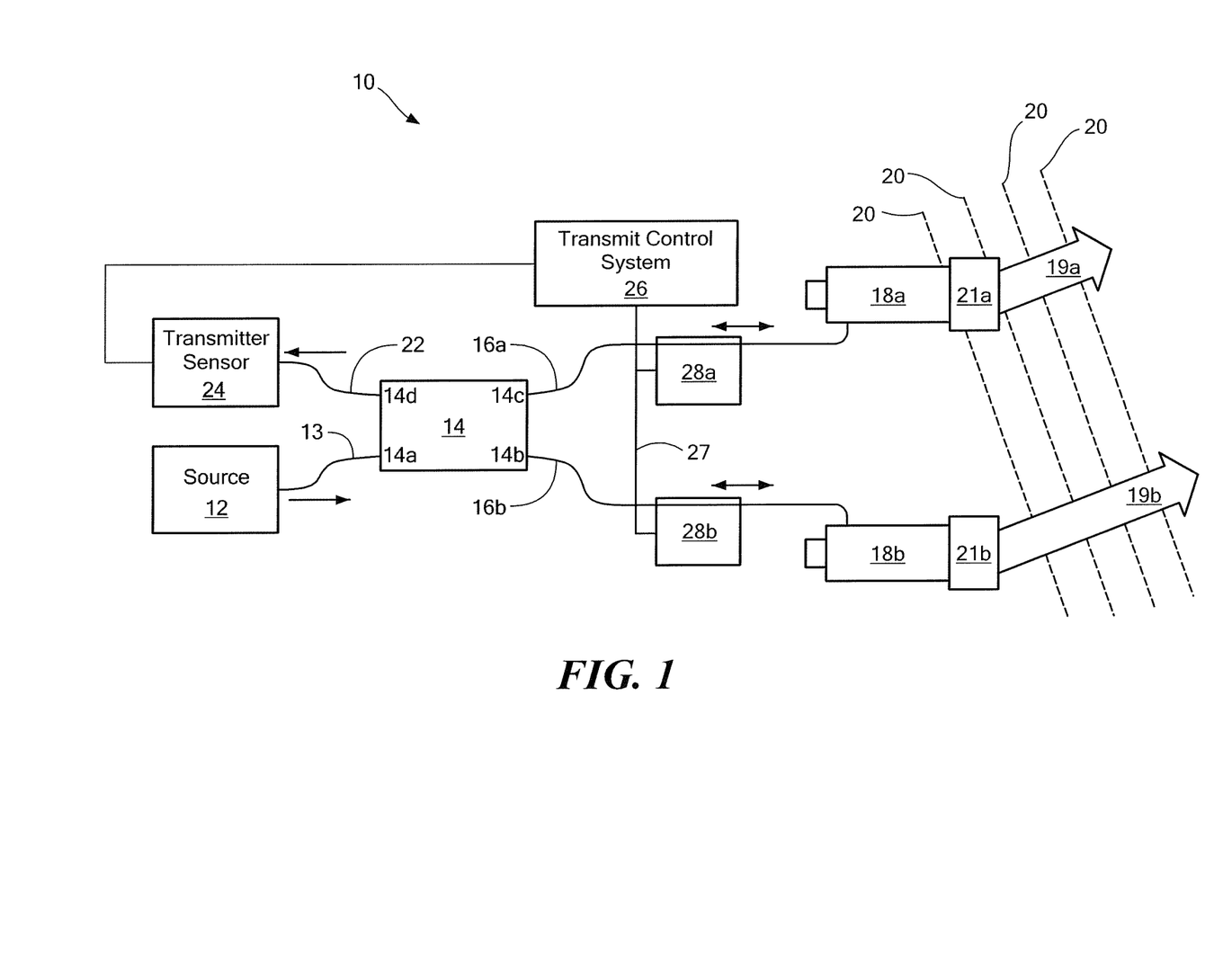
FIG. 1 is a block diagram of a transmit path of an optical system.

Referring now to FIG. 1, a transmit portion 10 of an exemplary optical system includes an optical source or transmitter 12 which provides an optical signal along a signal path 13 (e.g. an optical fiber) to an input port 14a of a coupler 14 which may, for example, be provided as a fiber directional coupler. Coupler 14 is here shown as a 2×2 coupler. In general, however, coupler 14 is provided having N outputs where N corresponds to the number of apertures included in system 10. Thus, coupler 14 may be generally referred to as a 2×N coupler. It should, of course, also be appreciated that other components (either a single component or a combination of components which are functionally equivalent to fiber optical coupler) may be used. In the following we take N to be two but it is understood that N may be a larger number as would be the case for a system having more than two apertures.

Coupler 14 provides (typically, but not obligatorily) equal power output signals at output ports 14b, 14c which are coupled via signal paths 16a, 16b to first ends of respective ones of a pair of optical apertures 18a, 18b. The optical signals propagate through respective ones of the apertures 18a, 18b and each aperture produces a beam 19a, 19b. The aperture beams are directed in the same direction, so the wavefronts making up the beams are parallel. The object of the present system and techniques described herein is to arrange that the wavefronts of these beams be in planes which are identical rather than only parallel. Such common wavefront planes are shown as wavefronts 20.

Each of the apertures 18a, 18b has a phase sampler associated therewith. The phase samplers are disposed to couple and re-direct signals each at aperture back through the respective transmit signal paths. As will be described in detail further below, these re-directed signals are processed and used to obtain transmit path coherence between all apertures needed to meet system requirements. The phase samplers are sometimes referred to as "local" back-coupling mechanisms since each phase sampler is associated with a single aperture and thus is "local" to that aperture.

In one embodiment, phase samplers 21a, 21b intercept a portion of each of the respective transmitted signals (or beams) as they exit each the respective apertures 18a, 18b and redirect the intercepted signal portions back into the respective aperture.

The portions of the transmit signals re-directed back into the respective apertures 18a, 18b propagate back through respective ones of signal paths 16a, 16b to coupler ports 14b, 14c and through coupler 14 to port 14d. The signal is coupled from coupler port 14d through a signal path 22 to a transmitter sensor 24.

As mentioned above, phase samplers 21a, 21b may be implemented using a variety of different structures and/or techniques. However, regardless of the specific manner in which phase samplers are implemented, the portion of the transmit signal which is captured and re-directed should preferably be noticeably stronger than any stray light which is reflected from other optical components. Generally, the portion which is redirected may be in the range of about five percent (5%) to about twenty-five percent (25%) of the transmitted signal power. It should, of course, be understood that the amount of light needed is dependent upon a variety of factors, including but not limited to, the type of modulation used, the amount of drift in the stray light amplitude, and other engineering factors which may be unique to a particular application. Thus, in some embodiments, the portion which is redirected may be outside the above noted exemplary range.

Transmitter sensor 24 detects the signal provided thereto from coupler port 14d and provides a sensor output signal to a transmit control system 26. Sensor output signal is provided having a signal characteristic (e.g. signal strength) which varies in accordance with the phase relationship between the signal portions re-directed from apertures 18a, 18b by phase samplers 21a, 21b. This variation is an automatic consequence of the fact that the coupler 14 operates on the optical electric field and produces an output field which depends on the sum of the N incident fields. Detection of the intensity of this sum field via a photodetector in the transmitter sensor produces the requisite phase-dependent signal, as is well known in the art. Transmit control system 26 (also referred to herein as a control module 26) performs phase detection, demodulation and analysis on the signals provided thereto from the transmitter sensor 24. This process, as is well known in the art of hill-climbing servo control, allows the control system to generate signals which drive the relative phase shifts of the apertures towards maximizing or minimizing the signal coupled into the sensor 24 and thus respectively minimizing or maximizing the signal coupled back into the source 12.

After analyzing the sensor output signal, control module 26 provides a control signal along signal path 27 to respective ones of a plurality of phase modulators 28a, 28b (each phase modulator receives its own control signal). Phase modulators 28a, 28b are coupled to respective ones of signal paths 16a, 16b. In response to the control signals provided thereto, the phase modulators 28a, 28b adjust the path lengths of the respective signal paths 16a, 16b.

The transmit control system 26 nullifies any phase error from the transmit source 12 (which may be provided as coherent source) to the phase samplers 20a, 20b and back to the transmitter sensor 24. This is accomplished by applying small time-dependent phase modulation to light coupled via a feed fiber to each aperture. In one embodiment this is achieved by applying a small, time-dependent length modulation to each aperture's feed fiber, e.g. fibers 16a, 16b via a fiber stretcher. This modulation will be referred to as "phase dither". In a system with N apertures, N distinct dither signals will be used. These may be sinusoidal with N different frequencies or may be appropriately designed (e.g., Walsh coded, see http.// en.wikipedia.org/wiki/Walsh_code) orthogonal digital signals. Thus, at the combined output port 14d they give distinguishable intensity modulations and thus the phase of each beam with respect to the phase of the overall sum may be extracted by synchronous detection.

As is well known in the art, an appropriate demodulation of the time-dependent signal amplitude at the transmit sensor 24 may thus be used to enable a hill-climbing servo loop to maximize a detected intensity of the redirected transmit signal potion. As is well known in the art, changing the phase of the reference signal provided by the phase-dither signal generator to the demodulation circuitry allows the "hill-climbing" servo to drive not to a maximum of the detected signal but instead to a minimum if desired. Such a loop is embodied by the sensor 24, the control system 26, and the modulation it applies to phase modulators 28. Thus the modulators 28 carry out two functions, and may in fact be comprised of more than one component, each optimized for one or the other function. One function is to provide a small-amplitude modulation of the phase shift. The other is to apply a phase shift (typically more slowly-varying but of larger amplitude) to achieve the overall phase equality of the two paths.

The small-amplitude modulation will also be present on the outgoing light, and its amplitude is chosen small enough (typically a small fraction of a radian) that the effect on the combined beam amplitude in the far field is negligible but large enough to provide sufficient signal-to-noise in the demodulation process within system 26. This finally results in a particular relationship between the phases at all phase-sampling points. The system is then calibrated so that this relationship corresponds to in-phase beams when the system is aimed at boresight.

Because the redirected transmit signal portions (i.e., control beams) pass twice through the transmit path (once in each direction), the transmit control system 26 ensures that the relative double-pass path lengths are an integer multiple of transmit wavelengths ($\lambda_{Tx}$), or, stated differently, that the relative phases between beam n and m ($\Delta\theta_{nm}$) are an integer multiple of $2\pi$ apart; here n and m are aperture identification numbers between 1 and N. Since the path is traversed twice, the relative phase at an exit plane of each aperture will be an integer multiple of $\pi$ but not necessarily of $2\pi$. This implies that the relative phases at the plane defined by the phase samplers are only being controlled to a $\lambda_{Tx}/2$, not the desired full wave. This introduces $\pi$ uncertainties or ambiguities. Notionally, the system tests the various possible phase shifts while remembering the intensity reported from a remote terminal and then chooses the one which results in maximum intensity indicating that the transmit phase paths have the same phase length. Once the system has been properly initialized, the ambiguities play no further role since the transmit control system prevents any discontinuous change in phase.

Assuming that the ambiguities are resolved, at a particular instant the wavefront of the transmitted beam from each of aperture will pass through a point defined by its phase sampler. For the purpose of the exemplary embodiment described herein, it is assumed that the phase samplers lie in a plane taken to be normal to boresight. It should, however, be appreciated that this is not a requirement. Whatever the relative position of the phase samplers, the calibration may be used to find the relative phase shifts which the control system 26 must apply so as to maintain the wavefront in a chosen fixed direction, e.g., normal to the boresight direction.

Phase actuator technology is one key to controlling relative phase and thus maintaining coherence between apertures. In the exemplary embodiment described herein, each aperture path contains two types of phase actuators. One type of phase actuator is referred to as a short-throw piezoelectric fiber phase shifter (FPS) which is used for fast phase changes. Slower, but possibly much larger, changes in phase are handled by the aperture's OPA pair in an embodiment using OPAs for beam steering. Alternatively, the larger changes in phase may be handled by the FPS by incorporating a means to detect when the FPS reaches the end of its range and then applying a quick "reset" signal which shifts the FPS phase shift by an integer number of waves. In multiple-aperture systems, the short disturbance of the transmit beam which occurs during the FPS reset may be acceptable. OPAs are described in U.S. Pat. No. 4,964,701 (Dorschner et al.).

This implementation detail is mentioned to show a means to circumvent the bandwidth limits on OPA-based phase shifters: a fast, short-throw phase shifter is in series with the slower "endless" OPA phase shifter. A control loop is wrapped around both phase shifters and uses the fast phase shifter to cancel fast (e.g., vibration-induced) disturbances, while offloading the long-term phase of these devices to the OPAs. Briefly, the endless phase-shift capability of OPA's can be implemented by walking a sawtooth phase pattern across an aperture. A shift of one full period results in a phase change of $2\pi$ radians.

Figure 3:
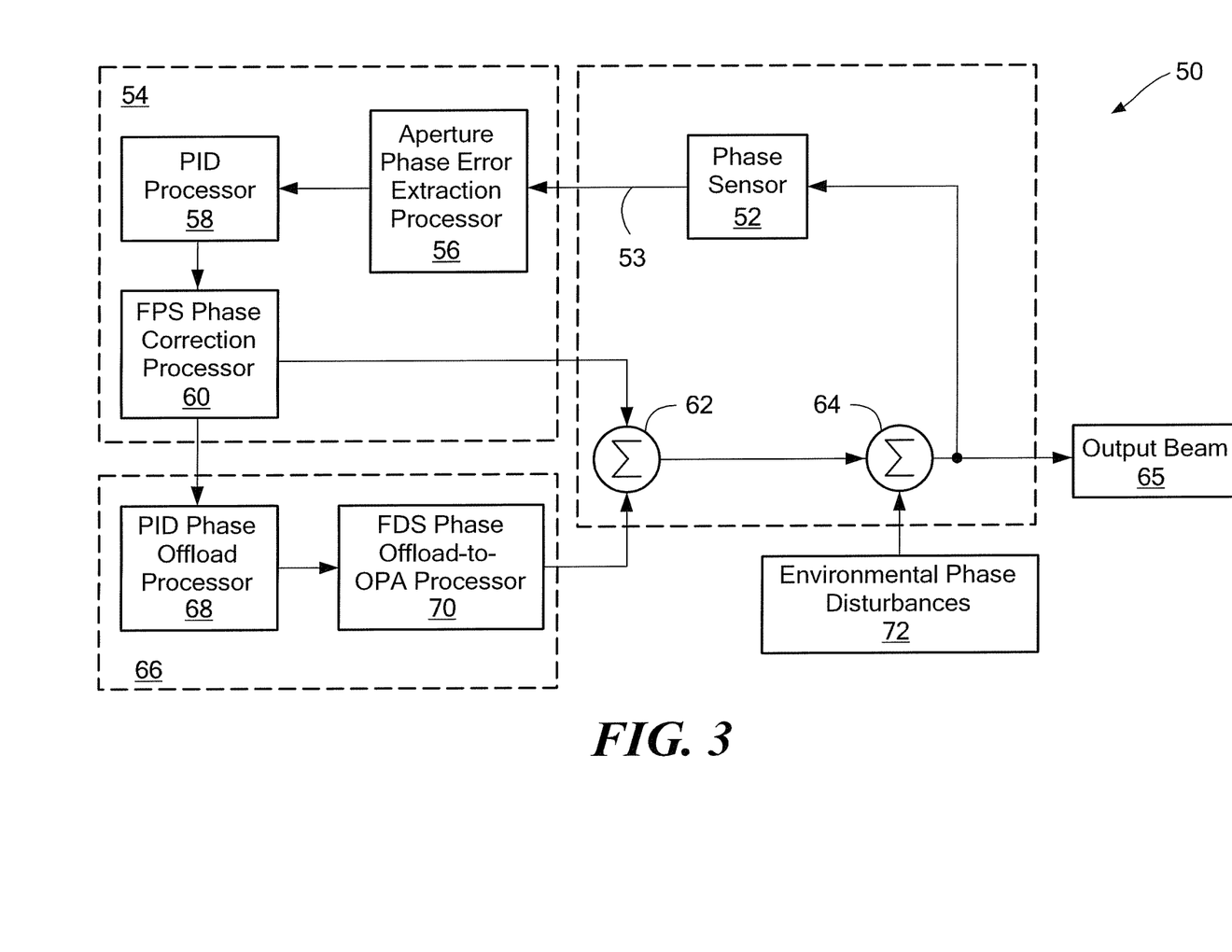
FIG. 3 is a functional block diagram illustrating the function of a control process.

Referring now to FIG. 3, a functional diagram of a phase control system 50 used to achieve a fixed phase relationship between the beams emitted from the two apertures is shown. As mentioned above, with appropriate calibration techniques this fixed phase relationship may be made such that the phase wavefronts of all beams are coplanar, thereby ensuring that in the far field the maximum intensity is achieved. Owing to slow drifts (e.g., thermal) in the relative positions of the phase samplers, the "fixed" phase relationship required may in fact vary slowly. Thus, in a practical system a means for low-bandwidth information exchange with the remote terminal or target is preferred.

A control scheme such as that described herein is needed because the round-trip travel time for light to and from the distant target usually is too slow to allow maintaining the required degree of coherence because of rapid variations in the internal pathlengths (e.g., the fibers). The control system here prevents such rapid variations from affecting the coplanarity of the transmitted wavefronts; the slower variations arising from drifts in the phase samplers must be dealt with by the mentioned low-bandwidth information exchange. Typically a bandwidth of a small fraction of 1 Hz is sufficient for the latter, which may be regarded as a continuous recalibration function. In contrast, the phase shifts induced by vibrations and also changes in the temperature of the internal fibers typically have bandwidths of several hundred Hz and can only be cancelled by a system such as disclosed herein. It should be appreciated that a phase control system (such as that shown in FIG. 3 and described in conjunction therewith) may be implemented in hardware, software or with a combination of hardware and software.

The signal paths shown in FIG. 3 are understood to carry phase (rather than, say, optical power). A phase sensor 52 detects a phase error from each output beam 65. As described above, each beam being furnished with a phase-dither signal which is distinct in frequency from the phase dither of all other beams. The phase of each output beam with respect to the phase of the overall beam is detected by using a synchronous detector, as is well known in the art. The phase sensor 52 incorporates the demodulation described above in conjunction with hill-climbing servo loop operation. It is understood that the required phase dither is provided separately, as well as the synchronization signals needed to enable synchronous demodulation, as is well known in the art. The phase sensor 52 provides a phase error signal along a path 53 to a system processor unit (SPU) 54. This signal may have low-pass filtering applied to it within the phase sensor 52 in accordance with usual practice in synchronous detection art, but is otherwise a faithful representation of the phase of the output beam with respect to the total of all beams. In particular, the signal from the sensor 52 is provided to an aperture phase error extraction processor 56 of the system processor unit (SPU) 54.

The aperture phase error extraction processor 56 receives the signal from the phase sensor 52 and derives a phase error for each aperture from the input phase errors fed thereto from phase sensor 52. Aperture Phase Error Extraction Processor 56 redistributes the error to each aperture via a sensitivity matrix.

The sensitivity matrix is intended to allow the processing of the redistributed phase error signals to be the same for all apertures. The sensitivity matrix incorporates the relative sensitivity of the various phase modulators and also accounts for any imbalance in the signal paths from aperture to coupler 14. It is functionally defined by the requirement that a small change in the phase of the light returned from a single aperture, which results in changes in the outputs of all the phase sensors, result in a signal being applied to the phase shifter of that single aperture which results in an identical phase shift. This matrix is determined by a calibration procedure as follows. A small, known perturbation signal (e.g., a voltage) is applied to the phase-shifter for the first aperture, and the resulting phase-detector outputs, for all apertures, recorded. This list comprises the first row of a matrix M. The remaining N−1 rows are determined by applying a similar perturbation signal to each of the remaining apertures in turn. The sensitivity matrix is then the mathematical pseudo-inverse of the matrix M. As is well-known in the art, such a pseudo-inverse may be obtained by including some requirement on the phase shifter outputs such as that the average mean-square phase shift be minimized The aperture phase error extraction processor 56 then provides a signal to a Proportional/Integral/Differential (PID) processor 58 which implements a standard PID technique to generate a phase correction necessary to counteract for the phase disturbances measured by phase sensor 52. The proportional part of the PID processor operation allows immediate reaction (for frequencies near the upper end of the loop bandwidth) to phase disturbances, by applying a scaled portion of the aperture phase error directly as a correction term. The integrator produces a correction which inexorably grows in time if any error remains and drives that error to zero. The two correction terms (i.e. the proportional part and the integral part) are added to produce an output value, as is well known in the art of servo control.

The PID processor 58 provides an output value to an FPS phase correction processor 60. The FPS phase correction processor 60 provides a correction signal to a first summing circuit 62 which also receives the output from the FPS offload processor 66 processor. The FPS offload processor is designed to hold the FPS phase shift within the control range of the FPS by "offloading" the low-bandwidth part of the required phase shifts to the OPAs. Thus, the overall phase shift is the sum of the high-bandwidth part, which is applied through the FPS, and the low-bandwidth part, applied through the OPAs; this sum is what is represented by summing block 62.

As is common in servo-control loop diagrams, the summed phase output from summing block 62 is perturbed by environmental influences, as represented by summing block 64, before being applied to the output beam. The various gain coefficients in the system are designed so that environmental perturbations are rapidly cancelled: the output from block 62 will be the negative of the environmental disturbance In the absense of the FPS offload loop, coherence could be maintained if the FPS had unlimited throw. Since the FPS does not have unlimited throw, but the OPA does, the OPAs are used to keep the FPS centered, by applying a small portion of the FPS phase correction to the aperture's OPA pair every processing cycle, as just described. This is referred to as a phase off-loading process and is designated with reference numeral 66 in FIG. 3. The PID Phase Offload Processor 68 extracts, via appropriate choice of the PID coefficients, the low-bandwidth part of the phase correction signal and then applies this to the OPAs, the processing necessary to convert phase to OPA control signals being performed by FPS phase offload-to-OPA processor 70. The latter processing involves the geometry of the OPAs and may be understood by reference to McManamon et al., Proc. IEEE vol 84 no 2, pp. 268-298, February 1996.

Once the phase corrections for each actuator (e.g. the FPS and the OPA) have been applied, an ideal static system would sense zero phase error. However, phase disturbances are always being generated by environmental factors. This perpetuates the need for the constant monitoring and correction of the system phase error to maintain coherence.

In summary: the SPU 54 receives a phase error for each aperture from the phase sensing system. The phase error for each aperture is derived from the input phase errors and redistributed to each aperture's processing block within the SPU via a sensitivity matrix. Using this approach, the necessary phase correction term for each aperture can be calculated using a common correction function. By writing the phase correction calculation as a single standardized function used for all apertures, the control process becomes easily scalable for large multi-aperture systems.

Although the technique described above in conjunction with FIG. 3 will maintain coherence in a static system, the objective for a practical optical transmit-receive system is to sustain coherence while changing the beam angle. That is, the system must dynamically perform phase control in real time.

Any path length disturbances would be immediately counteracted, by control system 26 (FIG. 1) operating as described so far, to maintain the "wavefronts normal to boresight" condition. Because in practical systems the wavefront is not fixed at boresight, additional features are required to the transmit approach to correct for the relative phase changes that result from the steering angle.

Figure 2:
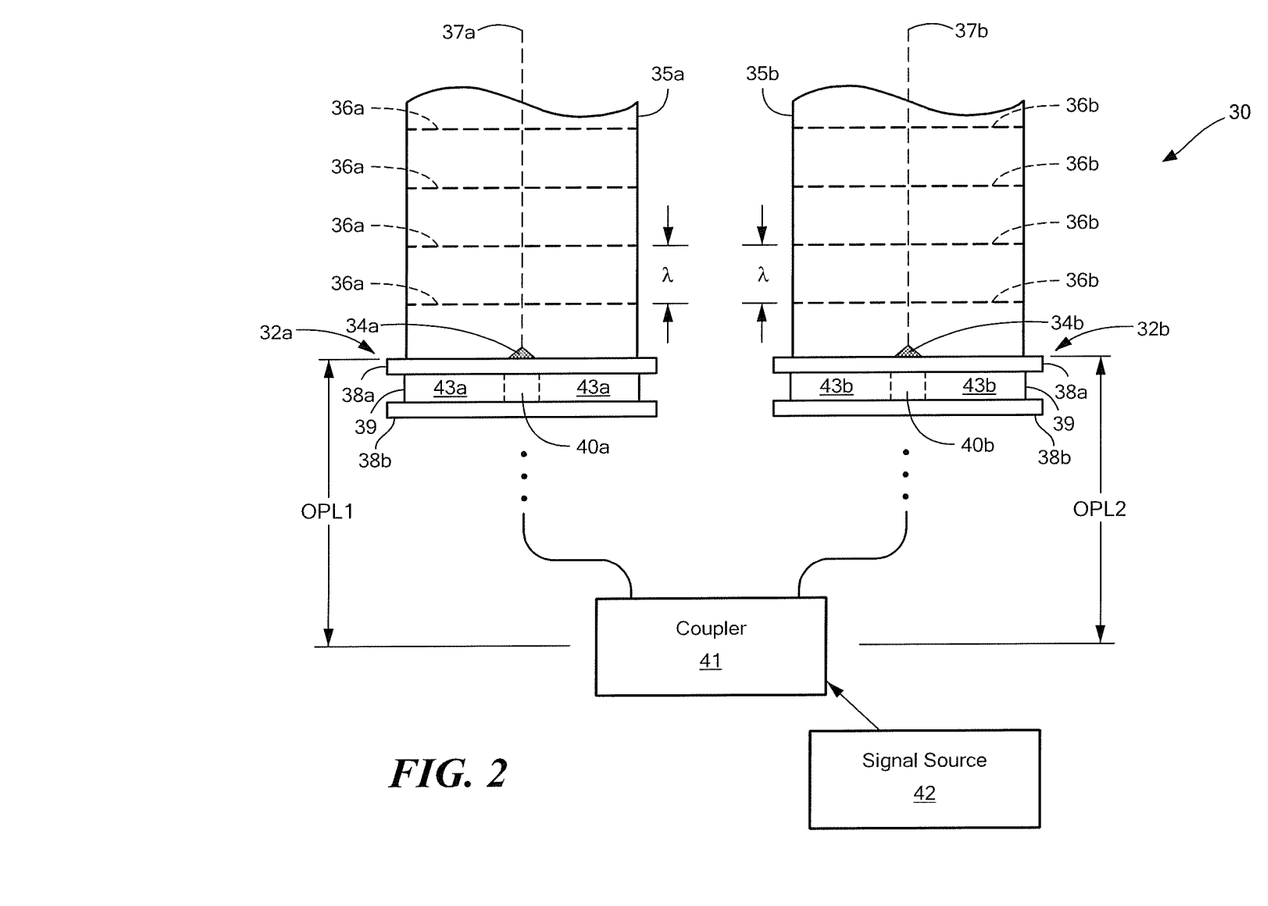
FIG. 2 is a block diagram of a two-aperture system.
Figure 2A:
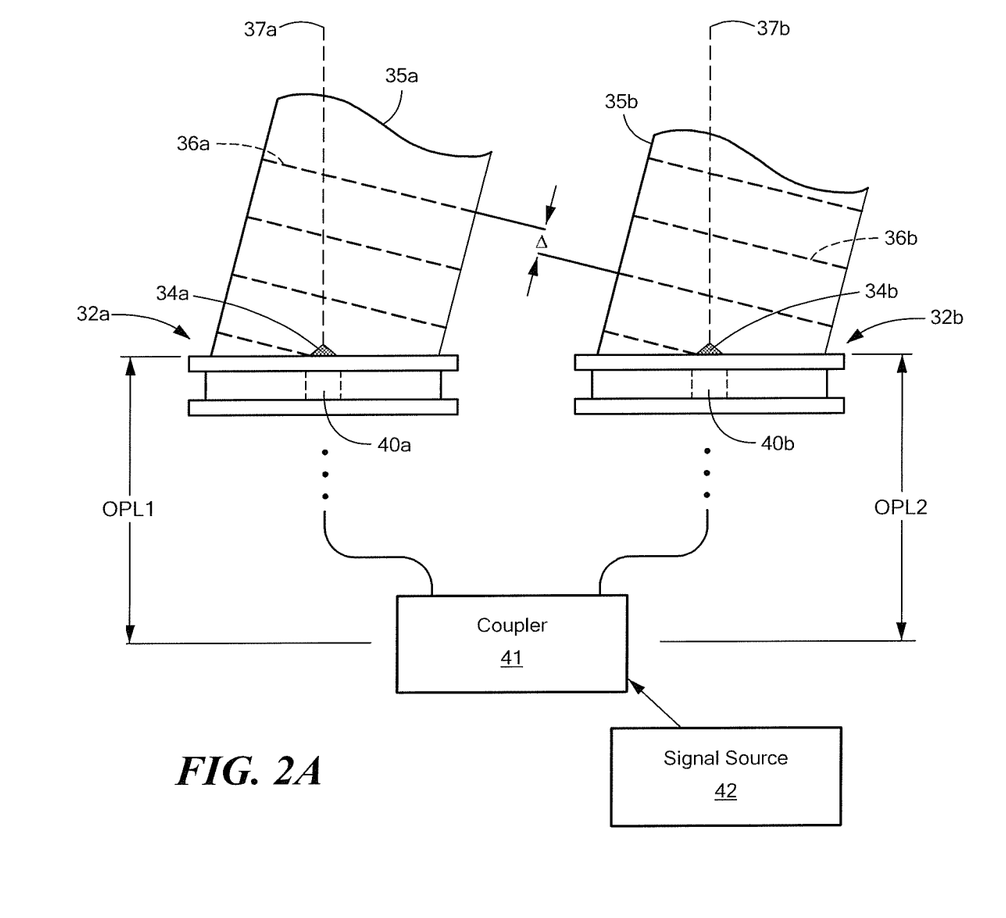
FIG. 2A is a block diagram of the two-aperture system of FIG. 2 with an uncorrected wavefront.
Figure 2B:
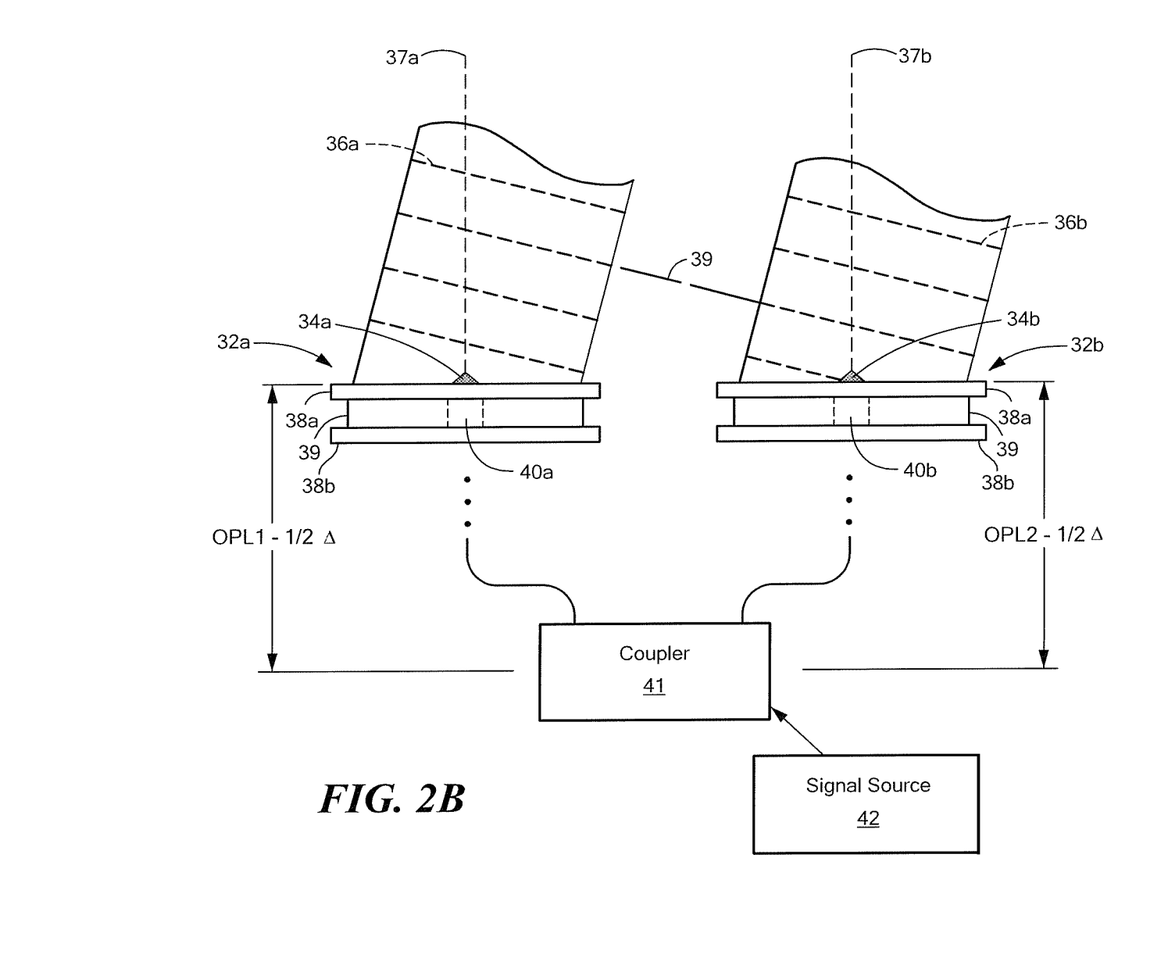
FIG. 2B is a block diagram of the two-aperture system of FIG. 2 with a corrected wavefront.

To illustrate this, reference is now made to FIGS. 2-2B in which like elements are provided having like reference designations throughout the several views, and in which a system 30 has two apertures 32a, 32b (shown in FIGS. 2-2B as being provided from a pair of plates 38a, 38b with a layer of material 39 therebetween; these plates and material schematically represent an OPA or OPA pair) with their respective transmit beams 35a, 35b and associated phase wavefronts 36a, 36b exiting in an unsteered state (i.e. transmit signals 36a, 36b exit apertures 32a, 32b, respectively, in a direction which is aligned with boresight of each transmit aperture and defined by axis 37a, 37b, respectively). Phase samplers 34a, 34b are disposed in a central portion 40a, 40b (e.g. a center portion) of each respective aperture 32a, 32b to produce two redirected back-coupled signals (not visible in FIGS. 2-2B since they are reflected back toward coupler 41) at each aperture. The redirected back-coupled signals are also referred to herein as control beams. These control beams are phase locked to provide a constant phase difference between the apertures (i.e. the control beams pass back through elements 21 and 18 in FIG. 1 and enter into fibers 16, where the control system modulates them and then uses the resulting time-dependent signal on the transmit sensor 24 to control the phase). It should be appreciated, in view of the above discussion of means to create control beams that the centrality of the portion of the aperture is not necessary but is simply shown here for clarity of exposition.

It should be appreciated that in FIGS. 2, 2A, a signal source 42 (e.g. a laser signal source) provides signals to apertures 32a, 32b via coupler 41. It should also be appreciated that coupler 41 may be of the same or a similar type to coupler 14 shown in FIG. 1, and elements 34 are parts of beam-steering subsystems 21 shown in FIG. 1.

Figure 4:
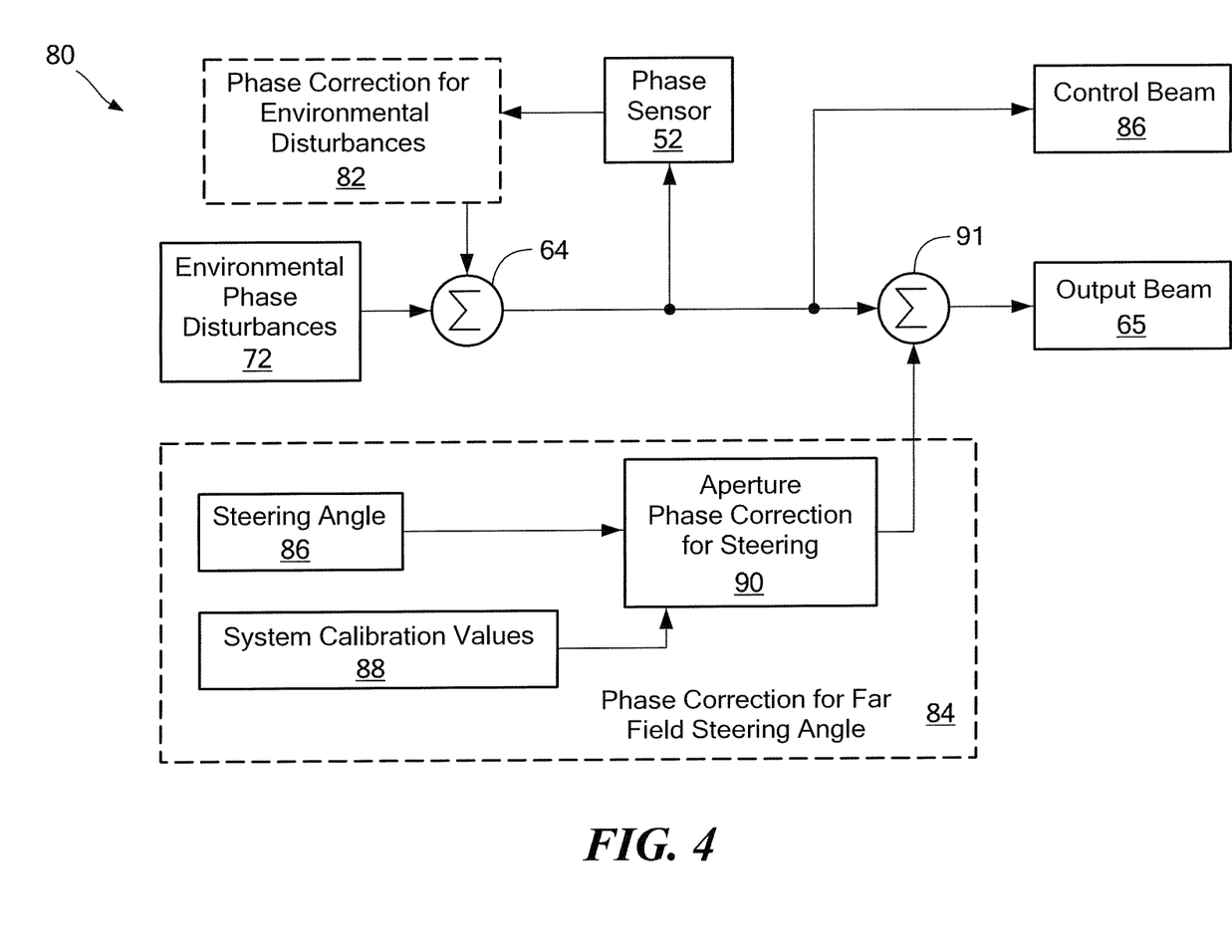
FIG. 4 is a functional block diagram illustrating the function of a control process with open-loop steering angle correction.

A control loop (such as that formed by coupler 14, transmitter sensor 24 and transmit control system module 26 in FIG. 1 and as shown in FIG. 4) continually monitors the control beams and corrects for changes in the relative path lengths (e.g. by adjusting transmit signal path phase lengths via phase modulators 28a, 28b) caused by environmental effects such as thermal variations and vibration.

A system which applied an offset to the output of the low-pass filter at the output of the phase sensor 52 (FIG. 3) would, in principle, allow making small adjustments to phase, but this requires very accurate knowledge of hardware losses, amplifier gains and detector sensitivities (i.e. the voltage to phase or phase to voltage transfer functions), and/or constant calibration of these parameters throughout the operational lifetime of the system.

Fortunately, optical phased arrays (OPAs) offer a simple alternative solution. Specifically, by using spatial partitioning within each aperture, the control beams may have phase shifts applied which are different from those applied to the transmitted beam. Such spatial partitioning is indicated by 40a, 40b in FIGS. 2-2B. This technique allows each beam to have independent phase control. The segmentation of the aperture allows the control loop to operate as intended which is to use control beams to maintain the relative aperture path lengths to integer multiples of $2\pi$, regardless of environmental perturbations of the platform.

Applying identical phase corrections to the transmit beam, via a phase actuator that is common to both transmit and control beams, guarantees that the localized thermal drift and vibrational disturbances are equally compensated. Utilizing the area of the OPAs that are only in the transmit beam as very accurate phase shifters as well as beam directors, the required angle-induced phase changes can be applied synchronously with the steering angle updates. Because the transmitted beam is spatially isolated from the control beam, the steering angle phase corrections are independent of the control beam. An added benefit of this approach is that it allows calibration of the phase samplers. Any out of plane errors from the mechanical positioning of the phase sampler can be determined and the errors removed electronically via the OPAs. This greatly alleviates the mechanical constraints for the fabrication of a phase sampler array.

While the system described above in conjunction with FIGS. 1-2B provides a platform in which the phase control concepts and techniques described herein find application, it is the control process and its implementation which enable successful coherent combining of transmit signals emitted from each aperture. In one embodiment, the control process is implemented via software executing in a processing device which provides the control mechanism for maintaining the uniform phase front received from and/or sent to a remote terminal.

In a non-scanning multiple aperture system, all phase changes occur due to environmental disturbances (i.e. temperature and vibrations) that produce path length differences between apertures. When scanning and pointing are used, additional aperture to aperture path length changes are introduced due to wavefront tilt in the far field. The techniques used to maintain phase locking with scanning will be discussed below in conjunction with FIGS. 4-5.

Referring now to FIG. 2A, as the transmit beams 35a, 35b are steered away from boresight axis 37a, 37b, the phase wavefronts 36a, 36b of the transmit beams are no longer coplanar, because the steering angle introduces a path length difference on the transmitted beams, designated $\Delta$ in FIG. 2A.

Maintaining maximum power flux at a remote terminal, however, requires achieving a uniform phase across all transmitted beams. That is, the phase wavefronts 36a, should lie in the same planes as phase fronts 36b rather than being offset by $\Delta$. This is shown in FIG. 2B in which phase wavefronts 36a, 36b of the two transmit beams 35a, 35b are aligned as shown by reference line 39.

To realign the steered wavefront, the transmit functionality requires phase offsets to correct the angle induced phase shifts. The technique described herein above works well to maintain the back-coupled total power at a maximum or minimum, i.e., to maintain phase offsets of zero (or $\pi$). To implement the phase change $\Delta$, a phase-control system such as that described above but with the addition of a phase calculated as described below in conjunction with FIG. 5 may be used.

The basic phase control implementation may be best understood from a discussion of the approach used to achieve coherence in the absence of scanning.

Thus, referring now to FIG. 4, in which like elements of FIG. 3 are provided having like reference designations a functional diagram of a phase control system 80 used to provide open-loop steering angle correction is shown. As indicated by element 82 in FIG. 4, environmental disturbances are handled in substantially the same manner as described in conjunction with FIG. 3, but an additional open loop functionality 84 is included to account for phase error generated by collectively steering the combined aperture beams as described in conjunction with FIG. 1. Such functionality may be provided, for example, by a phase correction processor 84 which utilizes steering angle 86 and system calibration values 88 to produce aperture phase correction for steering 90 which is then provided to a summing circuit 91 before being applied to the output beam 65.

Unlike environmental disturbances 72, closed-loop measurement of phase error due to the steering angle requires feedback from the remote terminal. Although information can be received from a remote terminal, the large time delay generated in the data transfer is insufficient for tight coherence control.

It has, however, been recognized that the solution to this problem lies in the accurate phase control that is achievable with OPAs. This allows open-loop application of calculated phase shifts to maintain coherence during scanning.

Figure 5:
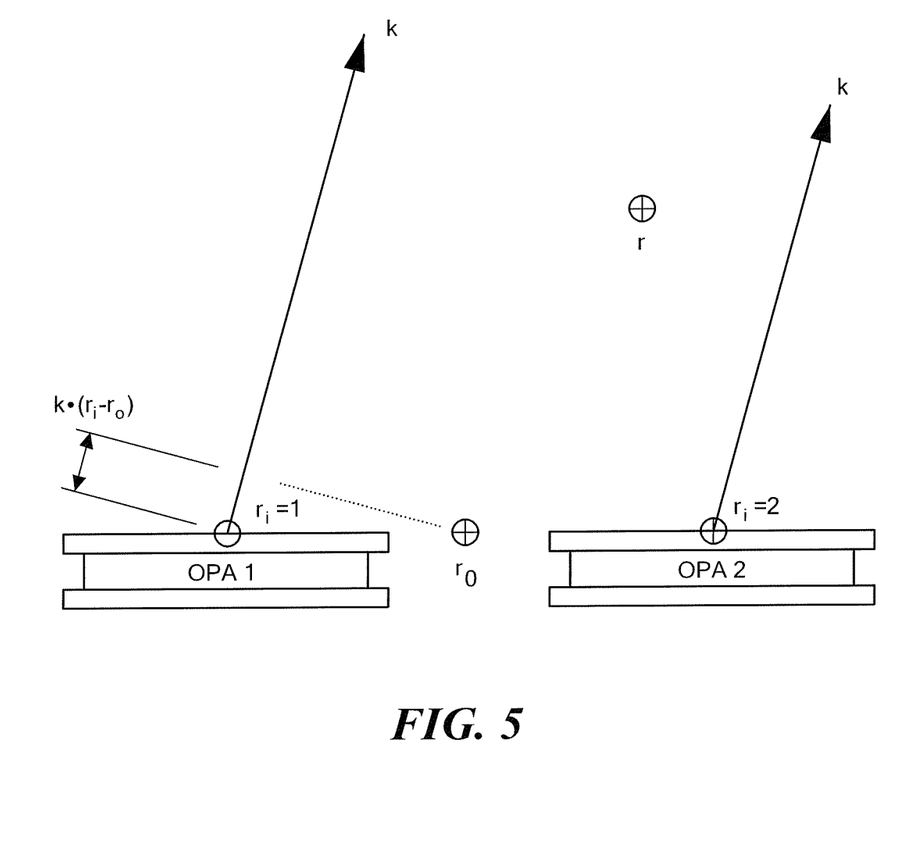
FIG. 5 is a block diagram of a portion of a multi-aperture system.

Referring now to FIG. 5, given a steering vector (k), the electric field $E_r$, at a point in space, r, is defined as shown in Equation (1):

$$E(r) \propto \exp(jk \bullet r - j\omega t) \quad \text{Equation (1)}$$

where:

k is a steering vector (a unit vector in the direction of the desired steered beam);

r is a point in space where the electric field is being measured;

ω is an optical frequency in radian measure; and t is time.

As usual, since all fields have the same dependence, Equation (1) can be re-written as shown in Equation (2):

$$E(r) \propto \exp(jk \bullet r) \quad \text{Equation (2)}$$

For a multi-aperture system, Equation (2) is separated into a steering and a phase offset term for each aperture. Introducing the nominal center of the array, $r_0$, and the origin of OPA steering coordinates (e.g., the center) of the $i^{th}$ aperture as shown in FIG. 5, Equation (2) can be re-written as Equation (3):

$$\exp(jk \bullet r) = \exp(jk \bullet r_0)\exp(jk \bullet (r - r_i))\exp(jk \bullet (r_i - r_0)) \quad \text{Equation (3)}$$

This leaves three distinct phase terms:

$k \bullet r_o$: an overall constant phase which is dropped;

$k \bullet (r - r_i)$: the customary form of a wave emitted from aperture whose center is $r_i$, i.e. what the OPAs in aperture i create in normal operation; and $k \bullet (r_i - r_0)$: the phase offset due to steering, which is what must be applied to ensure that all aperture beams combine into a single coherent beam.

Without the additional phase shift of the phase offset term, the path length difference would cause aperture-to-aperture phase errors at the remote terminal (shown in FIG. 5). As expressed in Equation (4), this error is removed by calculating the aperture phase error due to steering and subtracting it from the total aperture phase. That is, the phase calculated as the phase offset term is added to the phase applied to each (ith) aperture, thereby maintaining the needed overall plane-wave wavefront needed to coherently overlap the beams in the far field, just as if they came from a single large aperture.

$$\text{Aperture Phase Error due to Steering} = k \bullet (r_i - r_0) \quad \text{Equation (4)}$$

One important aspect of this correction is that it is only applied to the transmit/receive beam. If this correction was also applied to the control beam the control loop for the FPS would counter act nullifying the effect on the transmitted beam. Thus, the OPAs in each aperture are divided into a portion (e.g. 40a, 40b, FIGS. 2, 2A, 2B) which affects the phase of the control beams and a portion (e.g. 43a, 43b) which affects the phase of the main transmit/receive beam. Since the needed correction (Eq. 4) cannot be detected by the local-terminal control system, the process of correcting for steering phase error is an open loop process.

Since the phase shift applied by an OPA is accurate to about 0.01 wave, the far-field composite beam (the sum of the amplitudes from all the apertures) suffers only negligible loss from imperfect coherence.

Having described preferred embodiments which serve to illustrate various concepts, structures and techniques which are the subject of this patent, it will now become apparent to those of ordinary skill in the art that other embodiments incorporating these concepts, structures and techniques may be used.

For example, it should be appreciated that in the exemplary embodiment described hereinabove in conjunction with FIG. 1, optical transmit system 10 is shown having two apertures. Those of ordinary skill in the art will appreciate, of course, that practical systems typically include more than two apertures (e.g. N apertures). Thus, in the case where the optical system includes N apertures, coupler 14 would be provided as a 2×N coupler so as to couple a portion of the transmit signal to each of the N apertures. Thus, reference hereinabove to a transmit system 10 having two apertures was made merely for ease of description and to provide clarity in the description and the drawings and should not be construed as limiting as the concepts described above and below clearly apply to systems which include two or more apertures.

Thus, in one embodiment phase samplers intercept a portion of the transmitted signal (or beam) exiting each aperture and redirects the intercepted signal portion back into the aperture and back through the transmit signal path. The back reflected signal is used to control the individual path lengths. In this way, a technique for accounting for phase differences in a transmit path of an optical system is provided.

Accordingly, it is submitted that that scope of the patent should not be limited to the described embodiments but rather should be limited only by the spirit and scope of the following claims.

What is claimed is:

1. A system for adjusting a phase of a transmit path in an optical system comprising:

(a) a transmitter source having an output port;

(b) a coupler having an input port coupled to the output port of said transmitter source, a first port isolated from the input port and having a plurality of transmit path output ports;

(c) a like plurality of optical transmit paths each having a first end coupled to a respective one of the plurality of coupler transmit path output ports and a second end which terminates in an optical aperture;

(d) a like plurality of phase modulators, each of said phase modulators coupled to a corresponding one of said optical paths;

(e) a like plurality of phase samplers, each coupled to a corresponding one of said optical apertures and arranged to intercept a portion of a transmitted signal as it exits the corresponding one of said optical apertures and to redirect the intercepted signal portions back into the respective apertures and through the optical transmit path;

(f) a transmitter sensor coupled to the first port of said coupler to receive the redirected signal portions from said phase samplers and to generate a sensor signal in response to the redirected signal portions; and (g) a transmit control system coupled to receive the sensor signal from said transmit sensor and, in response thereto, to provide a control signal to each of said plurality of phase modulators.

2. A method of adjusting a phase of a transmit path of an optical transmit system, the method comprising:

(a) generating a transmit signal;

(b) directing the transmit signal through a plurality of transmit signal paths, each of the plurality transmit signal paths having an optical aperture at an end thereof;

(c) redirecting a portion of each transmit signal as it exits the corresponding one of said optical apertures back through the respective one of the plurality transmit signal paths;

(d) sensing the phase of each redirected signal; and (e) adjusting the phase length of a least one of the plurality of transmit signal paths in accordance with the sensed phase of each redirected signal.

3. The system of claim 1 wherein each of said plurality of phase samplers redirects the intercepted signal portion back through the same optical transmit path from which it came.

4. The system of claim 3 wherein the control signals provided by said transmit control system control the individual effective transmit path lengths of each optical transmit path.

5. The system of claim 4 wherein said transmit control system nullifies phase error from the transmitter source to the phase samplers and back to the transmitter sensor.

6. The system of claim 5 further comprising a plurality of feed fibers, each feed fiber coupled to a corresponding one of said plurality of apertures and wherein said transmit control system applies a time-dependent phase modulation to light coupled to each of said plurality of apertures via a corresponding one of said plurality of feed fibers.

7. The system of claim 6 wherein the time-dependent phase modulation provided by said transmit control system enables a hill-climbing servo type loop to maximize the detected intensity of the back-reflected signal portions by adjusting phase lengths of the transmit signal paths such that a particular relationship between the phases at the phase-sampling points is provided and such that the system can be calibrated so that this relationship corresponds to in-phase beams when the system is aimed at boresight.

8. The system of claim 6 wherein said transmit control system comprises a fiber-stretcher which provides the time-dependent phase modulation.

9. The method of claim 2 further comprising applying a time-dependent phase modulation to light coupled to each of said plurality of apertures.

10. The method of claim 9 wherein applying a time-dependent phase modulation comprises operating a fiber-stretcher to provide time-dependent phase modulation.

11. The method of claim 9 wherein the time-dependent phase modulation enables a hill-climbing servo type loop to maximize detected intensity of back-reflected signal portions by adjusting phase lengths of the transmit signal paths such that a particular relationship between the phases detected at phase-sampling points is provided and such that the system can be calibrated such that this relationship corresponds to in-phase beams when the beams are pointed at a particular steering angle.

12. The method of claim 11 wherein the particular steering angle corresponds to system boresight.

13. The method of claim 11 wherein in response to the beams being pointed at a steering angle which is different than the particular steering angle, the method further comprises correcting for the relative phase changes that result from pointing at a steering angle which is different than the particular steering angle.

14. The method of claim 13 wherein correcting for the relative phase changes that result from pointing at a steering angle which is different than the particular steering angle comprises:

computing an aperture phase error due to steering of the beam; and applying the computed phase shift directly to the beam.

15. The method of claim 14 wherein computing an aperture phase error due to steering of the beam comprises geometrically computing a phase shift correction.

16. The method of claim 15 further comprising applying the geometrically computed phase shift correction only to the transmit beam and not to the back-reflected signal portions.

17. A method of applying a phase correction in a transmit path of an optical transmitter, the method comprising:

intercepting, via a phase coupler, a portion of a transmitted signal as it exits an optical aperture of the transmit path;

redirecting the at least some of the intercepted signal portions back into the respective optical aperture and through the optical transmit path;

in response to at least some of the intercepted signal portions redirected back into the respective optical aperture and through the optical transmit path adjusting a short-throw phase shifter to cancel first phase disturbances; and in response to at least some of the intercepted signal portions redirected back into the respective optical aperture and through the optical transmit path adjusting an optical phased array (OPA) to cancel long phase shifts.

18. An optical system comprising a plurality of optical transmit paths, each of said plurality of optical transmit paths terminating in an optical aperture and each of said plurality of optical transmit paths including;

a phase sampler, coupled to a said optical aperture and arranged to intercept a portion of a transmitted signal as it exits said optical aperture and to reflect or otherwise redirect the signal portions back into the respective optical aperture and redirect the signal portions through the optical transmit path;

a short-throw phase shifter, responsive to redirected signal portions from said phase sampler and configured to provide a phase adjustment to cancel first phase disturbances; and an optical phased array (OPA) phase shifter, responsive to redirected signal portions from said phase sampler and configured to provide a phase adjustment to cancel long phase shifts.

19. The system of claim 18 wherein said short-throw phase shifter is provided as a short-throw piezoelectric fiber phase shifter (FPS) adapted to compensate for fast phase changes.

20. The system of claim 19 wherein said short-throw phase shifter is disposed in series with said OPA phase shifter.

21. The system of claim 20 wherein a control loop is coupled to both said short-throw phase shifter and said OPA phase shifter and said control loop uses said short-throw phase shifter to cancel fast phase disturbances, while offloading long-term phase to said OPA phase shifter and wherein offloading comprises altering a phase shift commanded to said OPA phase shifter while simultaneously oppositely altering the phase commanded to the short-throw phase shifter so as to reduce a magnitude of a phase shift of said fast phase shifter.

22. A multiple-aperture optical system comprising:
- a plurality of optical transmit paths, each of said optical transmit paths terminating in an optical aperture and each of said optical transmit paths including:
  - a phase sampler, coupled to a said optical aperture and arranged to intercept a portion of a transmitted signal as it exits said optical aperture and to reflect or otherwise redirect the signal portions back into the respective optical aperture and redirect the signal portions through the optical transmit path;
  - a fiber phase shifter (FPS) having a phase shift range and responsive to redirected signal portions from said phase sampler;
  - phase detection means for detecting when said FPS reaches the end of its phase shift range; and
  - signal reset means, responsive to said phase detection means, said signal reset means for applying a reset signal which shifts the FPS phase shift by an integer number of waves in response to a signal from said phase detection means indicating that said FPS reached the end of its phase shift range.

23. The method of claim 17 wherein the short-throw phase shifter is a piezoelectric fiber phase shifter.

* * * * *